United States Patent
Azad et al.

(10) Patent No.: US 11,645,188 B1
(45) Date of Patent: May 9, 2023

(54) PULL REQUEST RISK PREDICTION FOR BUG-INTRODUCING CHANGES

(71) Applicant: International Business Machines Corporation, Armonk, NY (US)

(72) Inventors: Amar Prakash Azad, Bangalore (IN); Harshit Kumar, Delhi (IN); Raghav Batta, San Jose, CA (US); Michael Elton Nidd, Zurich (CH); Larisa Shwartz, Greenwich, CT (US); Pritam Gundecha, San Jose, CA (US); Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/455,035

(22) Filed: Nov. 16, 2021

(51) Int. Cl.
*G06F 11/36* (2006.01)
*G06F 8/70* (2018.01)

(52) U.S. Cl.
CPC ............ *G06F 11/3604* (2013.01); *G06F 8/70* (2013.01); *G06F 11/3608* (2013.01)

(58) Field of Classification Search
None
See application file for complete search history.

(56) References Cited

U.S. PATENT DOCUMENTS

| | | | |
|---|---|---|---|
| 8,296,724 B2 | 10/2012 | Lindley | |
| 9,378,015 B2 | 6/2016 | Nagappan | |
| 9,448,787 B2 | 9/2016 | Rosomoff | |
| 9,542,176 B2 | 1/2017 | Bird | |
| 10,037,261 B2 | 7/2018 | Jhoney | |
| 10,747,652 B2 | 8/2020 | Narasimhan | |

(Continued)

FOREIGN PATENT DOCUMENTS

| | | |
|---|---|---|
| CN | 104899135 B | 9/2015 |
| CN | 109359007 A | 2/2019 |

(Continued)

OTHER PUBLICATIONS

Yuanrui Fan, "Early prediction of merged code changes to prioritize reviewing tasks", 2018, Empir Software Eng (Year: 2018).*

(Continued)

*Primary Examiner* — Lewis A Bullock, Jr.
*Assistant Examiner* — Mark A Gooray
(74) *Attorney, Agent, or Firm* — Michael O'Keefe (57) ABSTRACT

In an approach to risk prediction for bug-introducing changes, a computer retrieves one or more historic pull requests. A computer determines a unique file linking for each file included in the historic pull requests. A computer generates a file risk dataset. A computer performs chronological partitioning on the file risk dataset. A computer determines bug-introducing changes in the file risk dataset. A computer computes a collaborative file association between two or more of the files in the file risk dataset. A computer labels each of the files in the file risk dataset with an associated risk of introducing a bug. A computer generates a labelled file risk inducing ground truth dataset. A computer inputs the labelled file risk inducing ground truth dataset to a file risk prediction model. A computer extracts pull request features from the historic pull requests. A computer generates a pull request risk prediction model.

20 Claims, 4 Drawing Sheets

(56) References Cited

U.S. PATENT DOCUMENTS

| | | | |
|---|---|---|---|
| 10,891,218 | B2 | 1/2021 | Champlin-Scharff |
| 2013/0311968 | A1 | 11/2013 | Manoj |
| 2018/0267886 | A1* | 9/2018 | Durga .................... G06N 20/00 |
| 2019/0188292 | A1 | 6/2019 | Gkoulalas-Divanis |
| 2019/0227902 | A1* | 7/2019 | Cheng ...................... G06F 8/71 |
| 2020/0074313 | A1 | 3/2020 | Sharifi Sedeh |
| 2021/0055995 | A1 | 2/2021 | Biernacki |
| 2021/0255846 | A1 | 8/2021 | Mamgain |
| 2022/0300404 | A1* | 9/2022 | Deziel ................. G06F 11/3688 |

FOREIGN PATENT DOCUMENTS

| | | |
|---|---|---|
| CN | 112261118 A | 1/2021 |
| CN | 113067747 A | 7/2021 |

OTHER PUBLICATIONS

Batta et al., "Risk Assessment of a Proposed Change in a Computing Environment", U.S. Appl. No. 17/150,657, filed Jan. 15, 2021, 53 Pages.

Tripathy, Bata Krishna, "Risk Assessment in IT Infrastructure", Ethics, Laws, and Policies for Privacy, Security, and Liability, Jan. 28, 2020, 15 Pages.

"Patent Cooperation Treaty PCT International Search Report", Applicant's File Reference EE220990PCT, International Application No. PCT/CN2022/124480, International Filing Date: Oct. 11, 2022, dated Dec. 20, 2022, 9 pages.

\* cited by examiner

PULL REQUEST RISK PREDICTION FOR BUG-INTRODUCING CHANGES

BACKGROUND OF THE INVENTION

The present invention relates generally to the field of software development, and more particularly to pull request risk prediction for bug-introducing changes.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

In software development, a distributed version control system (also known as distributed revision control) is a form of version control in which the complete codebase, including its full history, is mirrored on each developer's computer, enabling automatic management branching and merging. When a bug is discovered or an enhancement defined, an "issue" (more generically, a "ticket") is created. Once a developer starts to work on that ticket, the developer creates a "branch," which, in effect, takes a snapshot of the current state of the codebase, and then tracks a series of "commits" where a developer "checks in" a change to the code. Once the changes are complete, the developer creates a "pull request" (PR) that constitutes a formal request to merge the changes in this branch back to the main codebase. Typically, the pull request must be reviewed by one or more other developers to validate the testing, correctness, etc. If a reviewer has questions, the questions are included in the review, which is attached to the pull request. Once all questions are answered, the pull request is approved, and merged into its parent.

After a PR has been merged, if a bug is discovered, the standard procedure is to fix the bug and not spend additional time updating the change history to tag the code change that caused the problem. Therefore, it may be difficult to train a supervised machine learning model from the history of problematic changes, since a labelled training set does not exist. In order to improve release frequency and deployment success, the feedback cycle between release and reflection must be shortened. One way to accelerate release frequency is to quickly and proactively identify whether incorporating file changes into production may introduce a risk of a disruption, for example, a bug. A large portion of incidents may be attributed to source code changes, configuration changes, environment changes, outdated security changes, etc. Even changes that are closed as successful can lead to incidents.

SUMMARY

A first aspect of the present invention discloses a computer-implemented method including a computer retrieving one or more historic pull requests, where each of the one or more historic pull requests includes one or more files. A computer determines a unique file linking for each of one or more files included in the one or more historic pull requests. A computer generates a file risk dataset based on the unique file linking. A computer performs chronological partitioning on the file risk dataset. A computer determines one or more bug-introducing changes in the file risk dataset based on the chronological partitioning. A computer computes a collaborative file association between two or more of the one or more files in the file risk dataset. A computer labels each of the one or more files in the file risk dataset with an associated risk of introducing a bug. A computer generates a labelled file risk inducing ground truth dataset based on the labelled one or more files in the file risk dataset. A computer inputs the labelled file risk inducing ground truth dataset to a file risk prediction model to generate a file risk assessment. A computer extracts one or more pull request features from the one or more historic pull requests. A computer generates a pull request risk prediction model based on the file risk assessment and the extracted one or more pull request features. The present invention has the advantage of using a pull request risk prediction model to predict the riskiness of merging a pull request by identifying risky changes early in a continuous integration/continuous deployment (CI/CD) environment, such as at the pull request merging level, which can significantly reduce the total number of incidents.

A second aspect of the present invention discloses a computer program product including one or more computer readable storage media and program instructions collectively stored on the one or more computer readable storage media. The stored program instructions include program instructions to retrieve one or more historic pull requests, where each of the one or more historic pull requests includes one or more files. The stored program instructions include program instructions to determine a unique file linking for each of one or more files included in the one or more historic pull requests. The stored program instructions include program instructions to generate a file risk dataset based on the unique file linking. The stored program instructions include program instructions to perform chronological partitioning on the file risk dataset. The stored program instructions include program instructions to determine one or more bug-introducing changes in the file risk dataset based on the chronological partitioning. The stored program instructions include program instructions to compute a collaborative file association between two or more of the one or more files in the file risk dataset. The stored program instructions include program instructions to label each of the one or more files in the file risk dataset with an associated risk of introducing a bug. The stored program instructions include program instructions to generate a labelled file risk inducing ground truth dataset based on the labelled one or more files in the file risk dataset. The stored program instructions include program instructions to input the labelled file risk inducing ground truth dataset to a file risk prediction model to generate a file risk assessment. The stored program instructions include program instructions to extract one or more pull request features from the one or more historic pull requests. The stored program instructions include program instructions to generate a pull request risk prediction model based on the file risk assessment and the extracted one or more pull request features.

A third aspect of the present invention discloses a computer system including one or more computer processors and one or more computer readable storage media, where program instructions are collectively stored on the one or more computer readable storage media. The stored program instructions include program instructions to retrieve one or more historic pull requests, where each of the one or more historic pull requests includes one or more files. The stored program instructions include program instructions to determine a unique file linking for each of one or more files included in the one or more historic pull requests. The stored program instructions include program instructions to generate a file risk dataset based on the unique file linking. The stored program instructions include program instructions to perform chronological partitioning on the file risk dataset. The stored program instructions include program instructions to determine one or more bug-introducing changes in the file risk dataset based on the chronological partitioning. The stored program instructions include program instructions to compute a collaborative file association between two or more of the one or more files in the file risk dataset. The stored program instructions include program instructions to label each of the one or more files in the file risk dataset with an associated risk of introducing a bug. The stored program instructions include program instructions to generate a labelled file risk inducing ground truth dataset based on the labelled one or more files in the file risk dataset. The stored program instructions include program instructions to input the labelled file risk inducing ground truth dataset to a file risk prediction model to generate a file risk assessment. The stored program instructions include program instructions to extract one or more pull request features from the one or more historic pull requests. The stored program instructions include program instructions to generate a pull request risk prediction model based on the file risk assessment and the extracted one or more pull request features.

In another aspect, the present invention discloses a method for chronological partitioning on the file risk dataset including one or more computer processors determining one or more files within the file risk dataset that are associated with commits that were bug-fixing commits. One or more computer processors identify one or more commits introduced prior to the bug-fixing commits as bug-introducing commits. One or more computer processors identify one or more files associated with the bug-introducing commits. An advantage of using chronological partitioning (determining which commits were made before a bug-fixing commit) to identify a bug-introducing pull request is that the process can take place much earlier in the development cycle, as opposed to many change-induced incident identification methods that rely on natural language techniques to match text between the change and incident tickets, which are used later at the software deployment stage.

DETAILED DESCRIPTION

Embodiments of the present invention recognize that proactively assessing risk associated with source code changes and providing risk explanation and risk mitigation actions can be a valuable input for site reliability engineers before deploying the changes as it can help prevent potential incidents and failures, thus minimizing the overall operational risk. Embodiments of the present invention also recognize that efficiency may be gained by automatically detecting risky changes at the time of a pull request by reducing the number of incidents and, therefore, accelerating release velocity and freeing software developers to continue writing code. In addition, embodiments of the present invention recognize that identifying a bug-introducing change is more difficult than identifying a bug-fixing change because a bug-fixing change explicitly specifies that it is addressing an identified bug, while a bug-introducing change does not. Further, embodiments of the present invention recognize that creating a labelled dataset for identifying bug-introducing changes is critical for creating a pull request risk prediction model. Implementation of embodiments of the invention may take a variety of forms, and exemplary implementation details are discussed subsequently with reference to the Figures.

Figure 1:
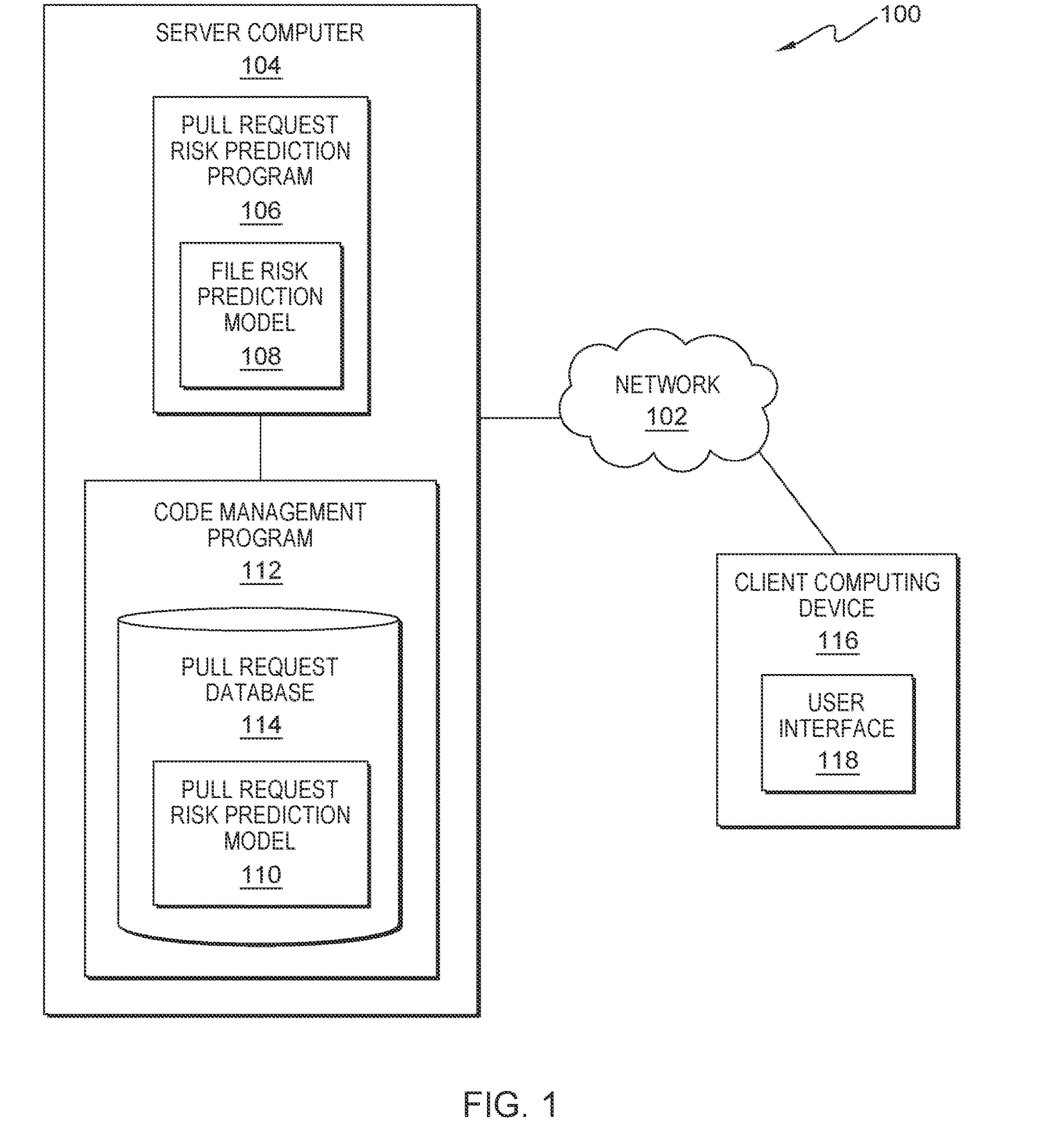
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 116, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 116, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 116 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes pull request risk prediction program 106 and code management program 112. Server computer 104 may include internal and external hardware components, as depicted and described in further detail with respect to FIG. 4.

Pull request risk prediction program 106 predicts the risk of a pull request introducing a bug into one or more files of source code by generating a pull request risk prediction model based on historical pull requests and then using the pull request risk prediction model on a newly created pull request. In the depicted embodiment, pull request risk prediction program 106 is a standalone program. In another embodiment, pull request risk prediction program 106 is integrated as a component of code management program 112. To generate the pull request risk prediction model, pull request risk prediction program 106 retrieves historic pull requests and determines unique file linking among the files in the historic pull requests. Based on the determined unique file linking, pull request risk prediction program 106 generates a file risk dataset. Pull request risk prediction program 106 performs chronological partitioning on the file risk dataset to determine bug-introducing changes. Pull request risk prediction program 106 computes a collaborative file association and labels each file with an associated risk. Pull request risk prediction program 106 generates a labelled file risk inducing ground truth dataset that includes the computed collaborative file association. Pull request risk prediction program 106 inputs the file risk inducing ground truth dataset to a file risk prediction model that extracts file features from the file risk inducing ground truth dataset and computes file togetherness score features. Pull request risk prediction program 106 applies a model to the extracted and computed features to generate a file risk assessment. Pull request risk prediction program 106 stores the file risk assessment. Pull request risk prediction program 106 extracts pull request features from historic pull requests. Pull request risk prediction program 106 combines the file risk assessment with the extracted pull request features to generate pull request risk prediction model 110. Pull request risk prediction program 106 stores pull request risk prediction model 110. Pull request risk prediction program 106 includes file risk prediction model 108.

To utilize pull request risk prediction model 110, pull request risk prediction program 106 receives a pull request. Pull request risk prediction program 106 determines unique file linking between the pull request files and generates a file risk dataset. Pull request risk prediction program 106 extracts file features from the file risk dataset and computes associated togetherness score features. Pull request risk prediction program 106 applies file risk prediction model 108 to the extracted and computed features to generate a file risk assessment. Pull request risk prediction program 106 extracts pull request features from the pull request. Pull request risk prediction program 106 applies pull request risk prediction model 110 to the combination of the file risk assessment and the extracted pull request features. Pull request risk prediction program 106 labels the pull request with the associated risk and stores the labelled pull request. Pull request risk prediction program 106 is depicted and described in further detail with respect to FIG. 2 and FIG. 3.

File risk prediction model 108 extracts file features from one or more files included in a commit that are labelled as risky and applies a statistical model to the extracted features to output a file risk assessment. File features may include, but are not limited to, a number of commits that include the file, a churn value, e.g., a number of lines added and/or subtracted, a number of changesets, and a togetherness score. In an embodiment, file risk prediction model 108 is a weak supervised machine learning model, i.e., where noisy, limited, or imprecise sources are used to provide supervision signal for labeling large amounts of training data in a supervised learning setting. In the depicted embodiment, file risk prediction model 108 is a component of pull request risk prediction program 106. In another embodiment, file risk prediction model may be a component of code management program 112. In a further embodiment, file risk prediction model 108 may reside elsewhere within distributed data processing environment 100 provided pull request risk prediction program 106 has access to file risk prediction model 108.

Code management program 112 is one of a plurality of distributed version control systems for managing changes to software during software development, as would be recognized by a person of skill in the art. In the depicted embodiment, code management program 112 resides on server computer 104. In another embodiment, code management program 112 may reside elsewhere within distributed data processing environment 100 provided that code management program 112 has access to pull request risk prediction program 106. Code management program 112 includes pull request database 114.

Pull request database 114 stores information used by and generated by pull request risk prediction program 106 and code management program 112. In the depicted embodiment, pull request database 114 resides on server computer 104. In another embodiment, pull request database 114 may reside elsewhere within distributed data processing environment 100, provided that pull request risk prediction program 106 and code management program 112 have access to pull request database 114, via network 102. A database is an organized collection of data. Pull request database 114 can be implemented with any type of storage device capable of storing data and configuration files that can be accessed and utilized by pull request risk prediction program 106 and code management program 112, such as a database server, a hard disk drive, or a flash memory. Pull request database 114 stores data files associated with one or more software development projects. Pull request database 114 also stores pull requests and commits submitted by the user of client computing device 116. In addition, pull request database 114 stores data used by pull request risk prediction program 106 to generate pull request risk prediction model 110, such as historical pull request, unique file linking, one or more file risk datasets, one or more togetherness scores, a labelled file risk inducing ground truth dataset, file features, a file risk assessment, one or more pre-defined risk levels, and pull request features. Further, pull request database 114 stores the results of the application of pull request risk prediction model 110, such as a labelled pull request. Pull request database 114 includes pull request risk prediction model 110.

Pull request risk prediction model 110 is generated by pull request risk prediction program 106, as will be discussed with respect to FIG. 2. Pull request risk prediction model 110 combines the file risk assessment created by file risk prediction model 108 with features extracted from a pull request to predict the risk of a bug-introducing change included in the pull request. An advantage of using a pull request risk prediction model to predict the riskiness of merging a pull request is that identifying risky changes early in a continuous integration/continuous deployment (CI/CD) environment, such as at the pull request merging level, can significantly reduce the total number of incidents.

Client computing device 116 can be one or more of a laptop computer, a tablet computer, a smart phone, smart watch, a smart speaker, or any programmable electronic device capable of communicating with various components and devices within distributed data processing environment 100, via network 102. Client computing device 116 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 116 may be integrated into a vehicle of the user. For example, client computing device 116 may include a heads-up display in the windshield of the vehicle. In general, client computing device 116 represents one or more programmable electronic devices or combination of programmable electronic devices capable of executing machine readable program instructions and communicating with other computing devices (not shown) within distributed data processing environment 100 via a network, such as network 102. Client computing device 116 includes an instance of user interface 118.

User interface 118 provides an interface between code management program 112 on server computer 104 and a user of client computing device 116. In one embodiment, user interface 118 is mobile application software. Mobile application software, or an "app," is a computer program designed to run on smart phones, tablet computers and other mobile devices. In one embodiment, user interface 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 118 enables a user of client computing device 116 to interact with code management program 112, for example, to create a pull request, as well as utilizing a plurality of other functions of code management program 112.

Figure 2:
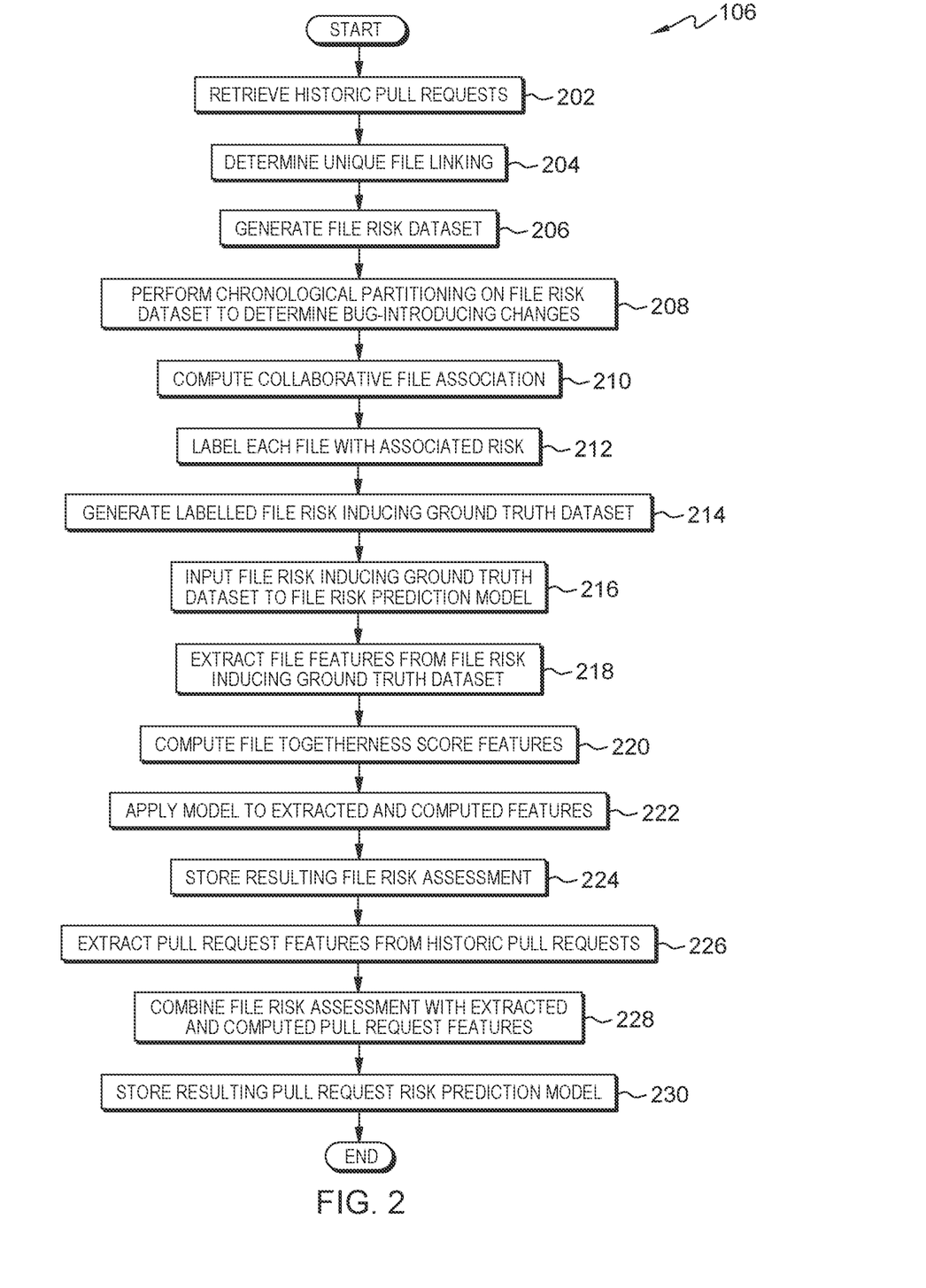
FIG. 2 is a flowchart depicting operational steps of a pull request risk prediction program, on a server computer within the distributed data processing environment of FIG. 1, for creating a pull request risk prediction model to predict the risk of bug-introducing changes, in accordance with an embodiment of the present invention.

FIG. 2 is a flowchart depicting operational steps of pull request risk prediction program 106, on server computer 104 within distributed data processing environment 100 of FIG. 1, for creating pull request risk prediction model 110 to predict the risk of bug-introducing changes, in accordance with an embodiment of the present invention.

Pull request risk prediction program 106 retrieves historic pull requests (step 202). In an embodiment, pull request risk prediction program 106 retrieves one or more historic pull requests from pull request database 114. A pull request is a formal request to merge file changes to a code repository, such as pull request database 114. Generally, a pull request contains one or more commits made over a period of time, and each commit consists of one or more changes, where each change is made to one or more files. A file can belong to multiple pull requests and/or commits. Typically, a pull request message and/or a commit message reflects an action taken in the pull request. In an embodiment, the historic pull requests are from one or more previous software development projects. In another embodiment, the historic pull requests are previous pull requests from the current software development project.

Pull request risk prediction program 106 determines unique file linking (step 204). In an embodiment, pull request risk prediction program 106 determines which files among the files in the historic pull requests are associated, or "linked," with one or more bug-introducing commits and removes any duplicate files such that pull request risk prediction program 106 identifies a unique list of linked files.

Pull request risk prediction program 106 generates a file risk dataset (step 206). Based on the determined unique file linking, i.e., the unique list of linked files, pull request risk prediction program 106 generates a file risk dataset. The file risk dataset is the set of files from each of the historic pull requests that pull request risk prediction program 106 identified by the unique file linking. In an embodiment, the files in the file risk dataset include both bug-fixing data and bug-introducing data.

Pull request risk prediction program 106 performs chronological partitioning on the file risk dataset to determine bug-introducing changes (step 208). Typically, a bug-introducing change occurs chronologically prior to a bug-fixing change. Often, the same set of files are associated with the bug-fixing change and the bug-introducing change. Chronological partitioning isolates the set of changes over a file before the bug-fixing change occurred, therefore, the subset contains only those candidate commits that include bug-introducing changes. Pull request risk prediction program 106 performs this chronological partitioning to construct a dataset, i.e., a corpus, for use in training pull request risk prediction model 110. In an embodiment, pull request risk prediction program 106 analyzes the files within the file risk dataset to determine which of the files are associated with commits that were bug-fixing commits, i.e., commits that were introduced to fix a detected bug in the software. Pull request risk prediction program 106 then identifies the commits introduced just prior to the bug-fixing commits as bug-introducing commits and identifies the files associated with the bug-introducing commits.

Pull request risk prediction program 106 computes collaborative file association (step 210). Collaborative file association helps to associate a file related to a set of bug-introducing files that are often committed together. In an embodiment, pull request risk prediction program 106 mines the historic commits and associated files that were identified as risk inducing, i.e., bug-introducing, as a result of the chronological partitioning performed in step 208. In an embodiment, the pairs of files are referred to as itemsets, i.e., sets of two files that were changed together or are closely associated with each other. In an embodiment, based on the computation of the collaborative file association, pull request risk prediction program 106 builds a lattice of related files consisting of sets of related files.

An advantage of using chronological partitioning (determining which commits were made before a bug-fixing commit) and collaborative file association (determining which files are typically committed together) to identify a bug-introducing pull request is that the process can take place much earlier in the development cycle as opposed to many change-induced incident identification methods that rely on natural language techniques to match text between the change and incident tickets, which are used later at the software deployment stage.

Pull request risk prediction program 106 labels each file with an associated risk (step 212). In an embodiment, based on the chronological partitioning and the collaborative file association, pull request risk prediction program 106 labels each file in the file risk dataset with a pre-defined risk. In an embodiment, risk levels are pre-defined by a system administrator and stored in pull request database 114. In an embodiment, the pre-defined risk levels are a binary set, such as 1 and 0, yes and no, or risky and not risky. In another embodiment, the pre-defined risk levels are a numerical value. For example, pull request risk prediction program 106 may assign a risk value of a number between 1 and 10. In another embodiment, the pre-defined risk levels are text in natural language. For example, pull request risk prediction program 106 may assign a risk value of risky, very risky, or extremely risky.

Pull request risk prediction program 106 generates a labelled file risk inducing ground truth dataset (step 214). In an embodiment, pull request risk prediction program 106 collates the labelled files into a file risk inducing ground truth dataset. In an embodiment, pull request risk prediction program 106 stores the labelled file risk inducing ground truth dataset in pull request database 114. In an embodiment, the file risk inducing ground truth dataset contains one or more risky files; a commit that contains a file from the file risk inducing ground truth dataset is a risky commit, and a pull request that contains a risky commit is a risky pull request. An advantage of generating a labelled file risk inducing ground truth dataset is that it provides labelled data for the supervised training of pull request risk prediction model 110. In an embodiment, the labelled file risk inducing ground truth dataset includes only bug-introducing data and not bug-fixing data.

Pull request risk prediction program 106 inputs the file risk inducing ground truth dataset to file risk prediction model 108 (step 216). In an embodiment, pull request risk prediction program 106 uses the result of step 214, i.e., the labelled file risk inducing ground truth dataset, as input to file risk prediction model 108.

Pull request risk prediction program 106 extracts file features from the labelled file risk inducing ground truth dataset (step 218). In an embodiment, pull request risk prediction program 106 extracts and/or computes file features, such as a number of commits that include the file, a churn value, e.g., a number of lines added and/or subtracted, and a number of changesets, from each of the files included in the labelled file risk inducing ground truth dataset. In an embodiment, pull request risk prediction program 106 instructs file risk prediction model 108 to extract the file features from the labelled file risk inducing ground truth dataset.

Pull request risk prediction program 106 computes file togetherness score features (step 220). In an embodiment, pull request risk prediction program 106 computes a togetherness score feature for each file included in the labelled file risk inducing ground truth dataset. The togetherness score captures the probability that files in the dataset are committed together. For example, if file 1 and file 3 occur together in all the commits, then the file association between them is 1. In another example, if file 1 and file 2 occur together in 1 of 3 commits, then the file association between them is 0.34. In addition, the togetherness score is dynamic, as it depends on the set of files included in a commit. In an embodiment, pull request risk prediction program 106 uses the mined pairs, i.e., itemsets, identified during collaborative file association, as discussed with respect to step 210, to compute the togetherness score value. In an embodiment, pull request risk prediction program 106 instructs file risk prediction model 108 to compute file togetherness score features.

Pull request risk prediction program 106 applies a model to the extracted and computed features (step 222). In an embodiment, pull request risk prediction program 106 applies a statistical model to the extracted and computed file features to generate a file risk assessment. For example, pull request risk prediction program 106 may apply a logistic regression model to predict a risk score. In another example, pull request risk prediction program 106 may use a classification model. In another embodiment, pull request risk prediction program 106 applies a machine learning model to the extracted and computed file features to generate the file risk assessment. In an embodiment, pull request risk prediction program 106 instructs file risk prediction model 108 to generate a file risk assessment based on the extracted and computed features.

Pull request risk prediction program 106 stores the resulting file risk assessment (step 224). In an embodiment, pull request risk prediction program 106 stores the file risk assessment that resulted from applying the model to the extracted and computed file features in pull request database 114.

Pull request risk prediction program 106 extracts pull request features from historic pull requests (step 226). In an embodiment, pull request risk prediction program 106 extracts features of historic pull requests stored in pull request database 114. Pull request features, as would be recognized by a person of skill in the art, may include, but are not limited to, a pull request description, a pull request short description, a number of participants in the pull request, a notation of whether one or more reviewers are assigned, a percentage of reviewers that approved, a number of conversations, a duration of the pull request (i.e., a time between creation and closure of the pull request), a number of problematic bug-introducing commits as a fraction or percentage of the total commits, a number of additions, a number of deletions, a unit test score, an integration test score, a code coverage score, a yapf score, and a lynting score. In an embodiment, pull request risk prediction program 106 uses one or more natural language processing (NLP) techniques to extract the features.

Pull request risk prediction program 106 combines the file risk assessment with the extracted pull request features (step 228). In an embodiment, pull request risk prediction program 106 combines the file risk assessment, as discussed with respect to step 222 and the extracted pull request features, as discussed with respect to step 226, to generate a labelled training set and train pull request risk prediction model 110.

Pull request risk prediction program 106 stores resulting pull request risk prediction model 110 (step 230). In an embodiment, pull request risk prediction program 106 stores pull request risk prediction model 110 as a file such that pull request risk prediction program 106 can apply the model to new pull requests as they are received. In the embodiment depicted in FIG. 1, pull request risk prediction program 106 stores pull request risk prediction model 110 in pull request database 114.

Figure 3:
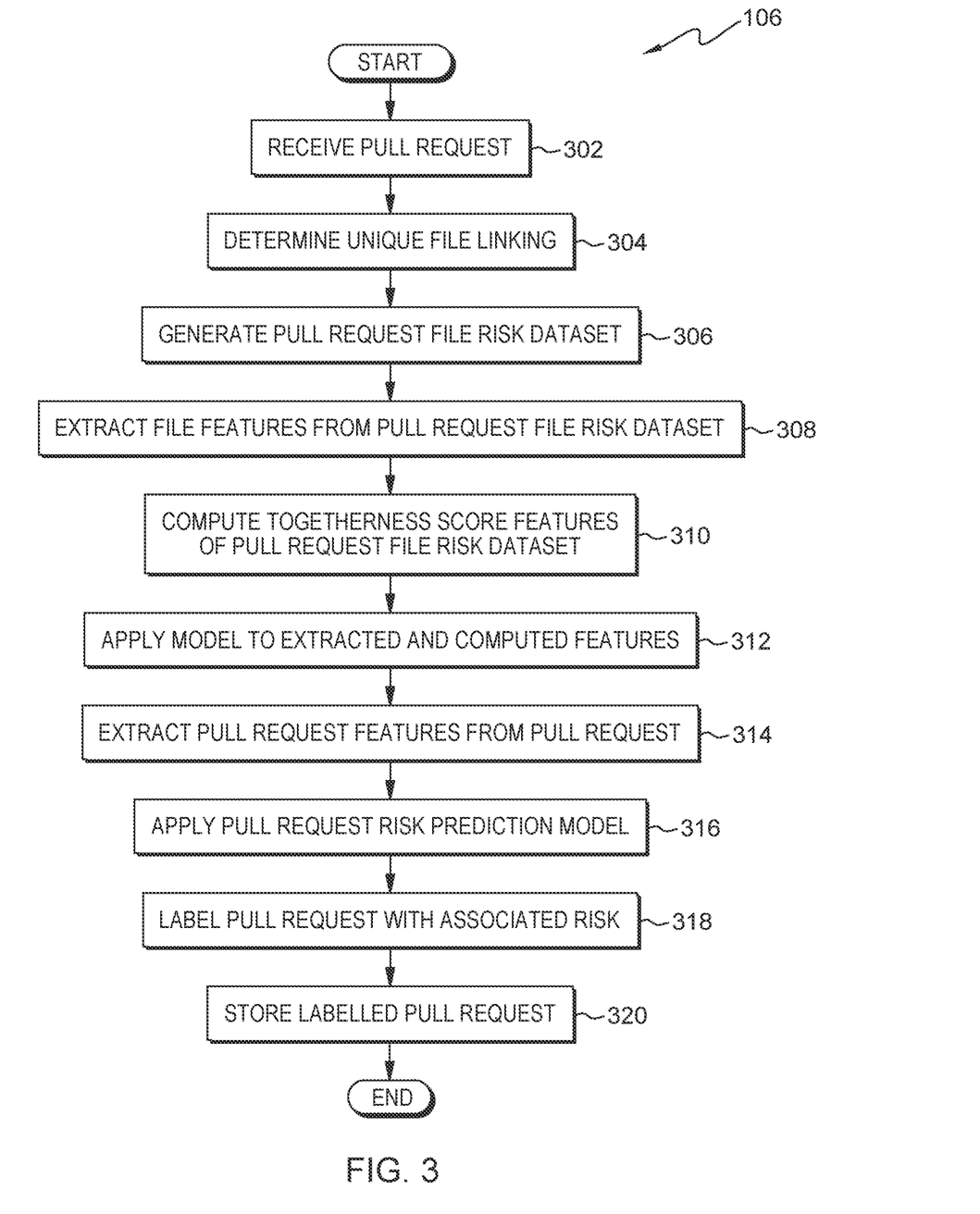
FIG. 3 is a flowchart depicting operational steps of the pull request risk prediction program, on the server computer within the distributed data processing environment of FIG. 1, for using the pull request risk prediction model, in accordance with an embodiment of the present invention.

FIG. 3 is a flowchart depicting operational steps of pull request risk prediction program 106, on server computer 104 within distributed data processing environment 100 of FIG. 1, for using pull request risk prediction model 110, in accordance with an embodiment of the present invention.

Pull request risk prediction program 106 receives a pull request (step 302). In an embodiment, a user of client computing device 116 generates a new pull request within code management program 112, via user interface 118, and pull request risk prediction program 106 receives the pull request. In an embodiment, code management program 112 transmits the new pull request to pull request risk prediction program 106.

Pull request risk prediction program 106 determines unique file linking (step 304). In an embodiment, pull request risk prediction program 106 analyzes the files included in the new pull request to determine which files are linked with one or more bug-introducing commits and removes any duplicate files such that pull request risk prediction program 106 identifies a unique list of linked files, as discussed with respect to step 204 of FIG. 2.

Pull request risk prediction program 106 generates a pull request file risk dataset (step 306). In an embodiment, pull request risk prediction program 106 generates a pull request file risk dataset associated with the new pull request. The pull request file risk dataset is the set of files included in the new pull request that pull request risk prediction program 106 identified by the unique file linking, as discussed with respect to step 206 of FIG. 2.

Pull request risk prediction program 106 extracts file features from the pull request file risk dataset (step 308). In an embodiment, pull request risk prediction program 106 extracts and/or computes file features, such as a number of commits that include the file, a churn value, e.g., a number of lines added and/or subtracted, and a number of changesets, from each of the files included in the file risk dataset, as discussed with respect to step 218 of FIG. 2.

Pull request risk prediction program 106 computes togetherness score features of the file risk dataset (step 310). In an embodiment, pull request risk prediction program 106 computes a togetherness score feature for each file included in the file risk dataset, as discussed with respect to step 220 of FIG. 2.

Pull request risk prediction program 106 applies a model to the extracted and computed features (step 312). In an embodiment, pull request risk prediction program 106 applies a model to the extracted and computed file features to generate a file risk assessment, as discussed with respect to step 222 of FIG. 2. In an embodiment, pull request risk prediction program 106 applies a statistical model to the extracted and computed file features to generate a file risk assessment. In another embodiment, pull request risk prediction program 106 applies a machine learning model to the extracted and computed file features to generate the file risk assessment.

Pull request risk prediction program 106 extracts pull request features from the pull request (step 314). In an embodiment, pull request risk prediction program 106 extracts features of the new pull request, as discussed with respect to step 226 of FIG. 2.

Pull request risk prediction program 106 applies pull request risk prediction model 110 (step 316). In an embodiment, pull request risk prediction program 106 applies pull request risk prediction model 110 to the file risk assessment and the extracted and computed pull request features to determine a risk associated with the new pull request.

Pull request risk prediction program 106 labels the pull request with the associated risk (step 318). In an embodiment, pull request risk prediction program 106 annotates the new pull request with the risk prediction determined by pull request risk prediction model 110.

Pull request risk prediction program 106 stores the labelled pull request (step 320). In an embodiment, pull request risk prediction program 106 stores the new pull request and associated risk prediction in pull request database 114. In an embodiment, pull request risk prediction program 106 sends a notification to the user of client computing device 116, via user interface 118, that describes the risk prediction for the new pull request.

Figure 4:
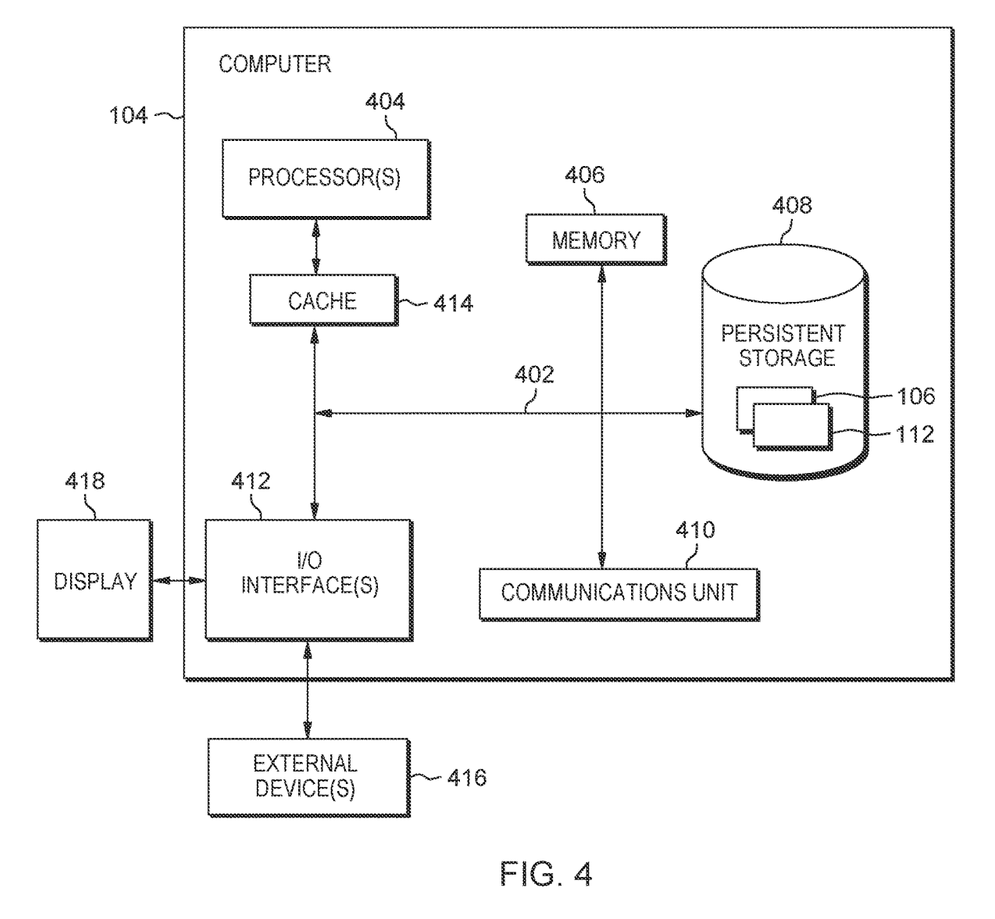
FIG. 4 depicts a block diagram of components of the server computer executing the pull request risk prediction program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., pull request risk prediction program 106 and code management program 112, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 116.

In these examples, communications unit 410 includes one or more network interface cards. Communications unit 410 may provide communications through the use of either or both physical and wireless communications links. Pull request risk prediction program 106, code management program 112, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., pull request risk prediction program 106 and code management program 112 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   generating a pull request risk prediction model by performing the steps of:
      retrieving, by one or more computer processors, one or more historic pull requests, wherein each of the one or more historic pull requests includes one or more files;
      determining, by one or more computer processors, a unique file linking for each of one or more files included in the one or more historic pull requests;
      generating, by one or more computer processors, a file risk dataset based on the unique file linking;
      performing, by one or more computer processors, chronological partitioning on the file risk dataset;
      determining, by one or more computer processors, one or more bug-introducing changes in the file risk dataset based on the chronological partitioning;
      computing, by one or more computer processors, a collaborative file association between two or more of the one or more files in the file risk dataset;
      labelling, by one or more computer processors, each of the one or more files in the file risk dataset with an associated risk of introducing a bug;
      generating, by one or more computer processors, a labelled file risk inducing ground truth dataset based on the labelled one or more files in the file risk dataset;
      inputting, by one or more computer processors, the labelled file risk inducing ground truth dataset to a file risk prediction model to generate a file risk assessment;
      extracting, by one or more computer processors, one or more pull request features from the one or more historic pull requests; and
      generating, by one or more computer processors, the pull request risk prediction model based on the file risk assessment and the extracted one or more pull request features; and
   determining an associated risk for a first pull request by performing the steps of:
      receiving, by one or more computer processors, the first pull request;
      generating, by one or more computer processors, a first file risk assessment by inputting one or more extracted first file features and a computed first togetherness score feature to the file risk prediction model;
      extracting, by one or more computer processors, one or more first pull request features from the first pull request;
      determining, by one or more computer processors, a first associated risk by inputting the first file risk assessment and the extracted one or more first pull request features to the pull request risk prediction model; and
      labelling, by one or more computer processors, the first pull request with the determined first associated risk.

2. The computer-implemented method of claim 1, wherein generating the file risk assessment further comprises:
   extracting, by one or more computer processors, one or more file features from the labelled file risk inducing ground truth dataset;
   computing, by one or more computer processors, a togetherness score feature for each of the one or more files in the labelled file risk inducing ground truth dataset;
   applying, by one or more computer processors, a statistical model to the one or more extracted features and the computed togetherness score features; and
   storing, by one or more computer processors, the file risk assessment.

3. The computer-implemented method of claim 2, wherein the one or more file features include at least one of a number of commits that include the file, a churn value, a number of lines added, a number of lines subtracted, and a number of changesets.

4. The computer-implemented method of claim 2, wherein the togetherness score feature captures a probability that files in a dataset are committed together.

5. The computer-implemented method of claim 1, wherein the one or more pull request features include at least one of a pull request description, a pull request short description, a number of participants in a pull request, a notation of whether one or more reviewers are assigned, a percentage of reviewers that approved a pull request, a number of conversations, a duration of a pull request, a number of problematic bug-introducing commits as a fraction or percentage of total commits, a number of additions, a number of deletions, a unit test score, an integration test score, a code coverage score, a yapf score, and a lynting score.

6. The computer-implemented method of claim 1, wherein determining the unique file linking for each of one or more files included in the one or more historic pull requests further comprises:
   determining, by one or more computer processors, which one or more files of the one or more files in the historic pull requests are linked with one or more bug-introducing commits;
   removing, by one or more computer processors, any duplicate files from the one or more files of the one or more files in the historic pull requests associated with the one or more bug-introducing commits; and
   identifying, by one or more computer processors, a unique list of linked files.

7. The computer-implemented method of claim 1, wherein performing the chronological partitioning on the file risk dataset further comprises:
   determining, by one or more computer processors, one or more files within the file risk dataset that are associated with commits that were bug-fixing commits;
   identifying, by one or more computer processors, one or more commits introduced prior to the bug-fixing commits as bug-introducing commits; and
   identifying, by one or more computer processors, one or more files associated with the bug-introducing commits.

8. The computer-implemented method of claim 1, wherein the one or more extracted first file features and the computed first togetherness core feature are determined by:
   determining, by one or more computer processors, a first unique file linking for each of one or more files included in the first pull request;
   generating, by one or more computer processors, a first file risk dataset based on the first unique file linking;
   extracting, by one or more computer processors, one or more first file features from the first file risk dataset;
   computing, by one or more computer processors, a first togetherness score feature for each of the one or more files in the first file risk dataset; and
   storing, by one or more computer processors, the labelled first pull request.

9. A computer program product comprising:
   one or more computer readable storage media and program instructions collectively stored on the one or more computer readable storage media, the stored program instructions comprising:
   program instructions to generate a pull request prediction model by performing the steps of:
      retrieving one or more historic pull requests, wherein each of the one or more historic pull requests includes one or more files;
      determining a unique file linking for each of one or more files included in the one or more historic pull requests;
      generating a file risk dataset based on the unique file linking;
      performing chronological partitioning on the file risk dataset;
      determining one or more bug-introducing changes in the file risk dataset based on the chronological partitioning;
      computing a collaborative file association between two or more of the one or more files in the file risk dataset;
      labelling each of the one or more files in the file risk dataset with an associated risk of introducing a bug;
      generating a labelled file risk inducing ground truth dataset based on the labelled one or more files in the file risk dataset;
      inputting the labelled file risk inducing ground truth dataset to a file risk prediction model to generate a file risk assessment;
      extracting one or more pull request features from the one or more historic pull requests; and
      generating the pull request risk prediction model based on the file risk assessment and the extracted one or more pull request features; and
   program instruction to determine an associated risk for a first pull request by performing the steps of:
      receiving the first pull request;
      generating a first file risk assessment by inputting one or more extracted first file features and a computed first togetherness score features to the file risk prediction model;
      extracting one or more first pull request features from the first pull request;
      determining a first associated risk by inputting the first file risk assessment and the extracted one or more first pull request features to the pull request risk prediction model; and
      labeling the first pull request with the determined first associated risk.

10. The computer program product of claim 9, wherein the program instructions to generate the file risk assessment comprise:
    program instructions to extract one or more file features from the labelled file risk inducing ground truth dataset;
    program instructions to compute a togetherness score feature for each of the one or more files in the labelled file risk inducing ground truth dataset;
    program instructions to apply a statistical model to the one or more extracted features and the computed togetherness score features; and
    program instructions to store the file risk assessment.

11. The computer program product of claim 10, wherein the togetherness score feature captures a probability that files in a dataset are committed together.

12. The computer program product of claim 9, wherein the program instructions to determine the unique file linking for each of one or more files included in the one or more historic pull requests comprise:
    program instructions to determine which one or more files of the one or more files in the historic pull requests are linked with one or more bug-introducing commits;
    program instructions to remove any duplicate files from the one or more files of the one or more files in the historic pull requests associated with the one or more bug-introducing commits; and
    program instructions to identify a unique list of linked files.

13. The computer program product of claim 9, wherein the program instructions to perform the chronological partitioning on the file risk dataset comprise:
    program instructions to determine one or more files within the file risk dataset that are associated with commits that were bug-fixing commits;
    program instructions to identify one or more commits introduced prior to the bug-fixing commits as bug-introducing commits; and
    program instructions to identify one or more files associated with the bug-introducing commits.

14. The computer program product of claim 9, wherein the one or more extracted first file features and the computed first togetherness score features are determined by the stored program instructions further comprising:
- program instructions to determine a first unique file linking for each of one or more files included in the first pull request;
- program instructions to generate a first file risk dataset based on the first unique file linking;
- program instructions to extract one or more first file features from the first file risk dataset;
- program instructions to compute a first togetherness score feature for each of the one or more files in the first file risk dataset; and
- program instructions to store the labelled first pull request.

15. A computer system comprising:
- one or more computer processors;
- one or more computer readable storage media;
- program instructions collectively stored on the one or more computer readable storage media for execution by at least one of the one or more computer processors, the stored program instructions comprising:
- program instructions to generate a pull request risk prediction model by performing the steps of:
- retrieving one or more historic pull requests, wherein each of the one or more historic pull requests includes one or more files;
- determining a unique file linking for each of one or more files included in the one or more historic pull requests;
- generating a file risk dataset based on the unique file linking; program instructions to perform chronological partitioning on the file risk dataset;
- determining one or more bug-introducing changes in the file risk dataset based on the chronological partitioning;
- computing a collaborative file association between two or more of the one or more files in the file risk dataset;
- labelling each of the one or more files in the file risk dataset with an associated risk of introducing a bug;
- generating a labelled file risk inducing ground truth dataset based on the labelled one or more files in the file risk dataset;
- inputting the labelled file risk inducing ground truth dataset to a file risk prediction model to generate a file risk assessment;
- extracting one or more pull request features from the one or more historic pull requests; and
- generating the pull request risk prediction model based on the file risk assessment and the extracted one or more pull request features; and
- program instructions to determine an associated risk for a first pull request by performing the steps of:
- receiving a first pull request;
- generating a first file risk assessment by inputting one or more extracted first file features and a computed first togetherness score features to the file risk prediction model;
- extracting one or more first pull request features from the first pull request;
- determining a first associated risk by inputting the first file risk assessment and the extracted one or more first pull request features to the pull request risk prediction model; and
- labeling the first pull request with the determined first associated risk.

16. The computer system of claim 15, wherein the program instructions to generate the file risk assessment comprise:
- program instructions to extract one or more file features from the labelled file risk inducing ground truth dataset;
- program instructions to compute a togetherness score feature for each of the one or more files in the labelled file risk inducing ground truth dataset;
- program instructions to apply a statistical model to the one or more extracted features and the computed togetherness score features; and
- program instructions to store the file risk assessment.

17. The computer system of claim 16, wherein the togetherness score feature captures a probability that files in a dataset are committed together.

18. The computer system of claim 15, wherein the program instructions to determine the unique file linking for each of one or more files included in the one or more historic pull requests comprise:
- program instructions to determine which one or more files of the one or more files in the historic pull requests are linked with one or more bug-introducing commits;
- program instructions to remove any duplicate files from the one or more files of the one or more files in the historic pull requests associated with the one or more bug-introducing commits; and
- program instructions to identify a unique list of linked files.

19. The computer system of claim 15, wherein the program instructions to perform the chronological partitioning on the file risk dataset comprise:
- program instructions to determine one or more files within the file risk dataset that are associated with commits that were bug-fixing commits;
- program instructions to identify one or more commits introduced prior to the bug-fixing commits as bug-introducing commits; and
- program instructions to identify one or more files associated with the bug-introducing commits.

20. The computer system of claim 15, wherein the one or more extracted first file features and the computed first togetherness score features are determined by the stored program instructions further comprising:
- program instructions to determine a first unique file linking for each of one or more files included in the first pull request;
- program instructions to generate a first file risk dataset based on the first unique file linking;
- program instructions to extract one or more first file features from the first file risk dataset;
- program instructions to compute a first togetherness score feature for each of the one or more files in the first file risk dataset; and
- program instructions to store the labelled first pull request.

* * * * *